United States Patent
Cabanillas et al.

(10) Patent No.: US 10,200,427 B2
(45) Date of Patent: Feb. 5, 2019

(54) SYSTEMS AND METHODS FOR STREAMING DIGITAL CONTENT USING AN INTERMEDIATE SERVER

(71) Applicant: Facebook, Inc., Menlo Park, CA (US)

(72) Inventors: Helios Alonso Cabanillas, London (GB); Daniel Shabtai, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 167 days.

(21) Appl. No.: 14/154,014

(22) Filed: Jan. 13, 2014

(65) Prior Publication Data
US 2015/0200988 A1     Jul. 16, 2015

(51) Int. Cl.
| | | |
|---|---|---|
| *H04L 29/06* | (2006.01) | |
| *H04L 29/08* | (2006.01) | |
| *G06F 17/30* | (2006.01) | |
| *H04W 4/21* | (2018.01) | |

(52) U.S. Cl.
CPC .... *H04L 65/4084* (2013.01); *G06F 17/30902* (2013.01); *H04L 67/02* (2013.01); *H04L 67/2842* (2013.01); *H04W 4/21* (2018.02)

(58) Field of Classification Search
CPC ... H04L 65/60; H04L 65/403; H04L 67/2847; H04L 65/4084; G06F 17/30902; H04W 4/206; H04W 4/21; G06Q 50/01
See application file for complete search history.

(56) References Cited

U.S. PATENT DOCUMENTS

| | | | | |
|---|---|---|---|---|
| 2002/0019853 A1* | 2/2002 | Vange | ................... | G06F 9/5027 709/207 |
| 2002/0059440 A1* | 5/2002 | Hudson | ............. | G06F 17/30902 709/231 |
| 2004/0138948 A1* | 7/2004 | Loomis | .................. | G11B 20/10 700/94 |
| 2004/0234253 A1* | 11/2004 | Mahdavi | ............ | H04N 7/17336 386/277 |
| 2009/0292819 A1* | 11/2009 | Kandekar | .......... | H04N 7/17318 709/231 |
| 2010/0332586 A1* | 12/2010 | Jogand-Coulomb | ........ | H04L 67/2847 709/203 |
| 2011/0087842 A1* | 4/2011 | Lu | ...................... | G06F 17/30902 711/126 |
| 2013/0138775 A1* | 5/2013 | Shah | ..................... | H04L 12/584 709/219 |
| 2015/0163320 A1* | 6/2015 | Hu | ...................... | H04L 67/2852 709/214 |

(Continued)

*Primary Examiner* — Chris Parry
(74) *Attorney, Agent, or Firm* — Sheppard Mullin Richter & Hampton LLP

(57) ABSTRACT

Techniques provided herein implement systems and methods that can improve access to content items, from an online content source, by a client device. According to some embodiments, an intermediate content streaming system is implemented on a client device for caching digital content locally at the client device as the content is streamed to the client device from an online content source (e.g., content server) over a network. Additionally, according to some embodiments, a priority-based content downloading system is implemented on a client device to facilitate priority-based pre-downloading of content items to the client device before a user at the client device is presented with access to the content items, such as through a social networking news feed.

19 Claims, 8 Drawing Sheets

(56) References Cited

U.S. PATENT DOCUMENTS

2015/0301981 A1* 10/2015 Huang ............ H04N 21/64784
709/213

* cited by examiner

SYSTEMS AND METHODS FOR STREAMING DIGITAL CONTENT USING AN INTERMEDIATE SERVER

FIELD OF THE INVENTION

The present application relates to digital content and, in particular, downloading digital content streamed from a server to a client.

BACKGROUND

Through its various features, social networks provide access to a variety of digital content, including multimedia content containing, for example, text, video, audio, presentations, or images. These and other forms of digital content (hereafter referred to as "content") allow social network users to, for example, communicate with one another through electronic messaging, chat rooms, postings, and message boards. Users often access social networks and their associated content through a standalone application (e.g., a mobile application dedicated to the social network or a web browser capable of accessing a web page of the social network) operating on a client device, such as a desktop computer, a laptop computer, a tablet computing device, or a data-enabled mobile phone.

Typically, as a user requests access to content provided by the social network, the standalone application downloads the requested content, in whole or in part, to the client device in order to facilitate access to the content through the standalone application. Due in part to the fact that social networks often rely on computer networks for data transfer of their content to the client device, access to the content may be delayed or inefficient based on computer network conditions (e.g., the client device's network connection speed). This may be particularly troubling when the content is being accessed at the client device as the content is being streamed to the client device.

SUMMARY

According to some embodiments, systems, methods, and computer readable media identify, at a client device, one or more first portions of a content item requested from a content server by a first content access application. The first content access application may be operating on the client device. The systems and methods can identify a first set and a second set of content data of the content item. The first set of content data may correspond to the first portions of the content item stored on a local cache of the client device, and the second set of content data may correspond to the first portions of the content item not stored on (or missing from) the local cache. The systems and methods can provide from the local cache at least some of the first set of content data to the first content access application. The systems and methods can request at least some of the second set of content data from the content server, receive the at least some of the second set of content data from the content server, and provide the at least some of the second set of content data to the first content access application. The systems and methods can also store the at least some of the second set of content data to the local cache.

In some embodiments, the systems and methods intercept, at the client device, a request for the content item from the first content access application to the content server before the request is received by the content server.

In some embodiments, the systems and methods receive, at the client device, the request for the content item from the first content access application to the content server.

In some embodiments, the first content access application comprises a buffer, the buffer being different from the local cache.

In some embodiments, the local cache is external to the first content access application.

In some embodiments, the at least some of the first set of content data is provided to the first content access application as a data stream.

In some embodiments, the at least some of the second set of content data is received from the first content server as a data stream.

In some embodiments, the at least some of the second set of content data is provided to the first content access application as a data stream.

In some embodiments, the first portions correspond to a time position in the content item In some embodiments, the systems and methods identify, at the client device, one or more second portions of the content item requested by a second content access application from the content server. The second content access application may be operating on the client device. The systems and methods can identify a third set and a fourth set of content data of the content item. The third set of content data may correspond to the second portions of the content item stored on the local cache of the client device, and the fourth set of content data may correspond to the second portions of the content item not stored on the local cache. The fourth set of content data may exclude content data in the first set of content data and the second set of content data. The systems and methods can provide from the local cache at least some of the third set of content data to the first content access application. The systems and methods can request at least some of the fourth set of content data from the content server. The systems and methods can receive the at least some of the fourth set of content data from the content server. The systems and methods can provide the at least some of the fourth set of content data to the first content access application. The systems and methods can store the at least some of the fourth set of content data to the local cache.

In some embodiments, the systems and methods purge at least some content data from the local cache based on a priority of the content item. The purging the at least some content data may be performed when an amount of content data stored in the local cache meets or exceeds a storage threshold In some embodiments, the systems and methods determine whether the amount of content data stored in the local cache meets or exceeds a storage threshold.

In some embodiments, the systems and methods determine a priority for the content item. The determining the priority can be based on at least one of whether the content item is auto-played when visible to the user, and availability of a resource of the client device. The determining the priority can be based on at least one of a content type of the content item, whether the content item is associated with an advertisement, and metadata of the content item. The determining the priority can be based on social networking information associated with the content item.

In some embodiments, the content access application relate to a social network.

Many other features and embodiments of the invention will be apparent from the accompanying drawings and from the following detailed description.

Figure 1:
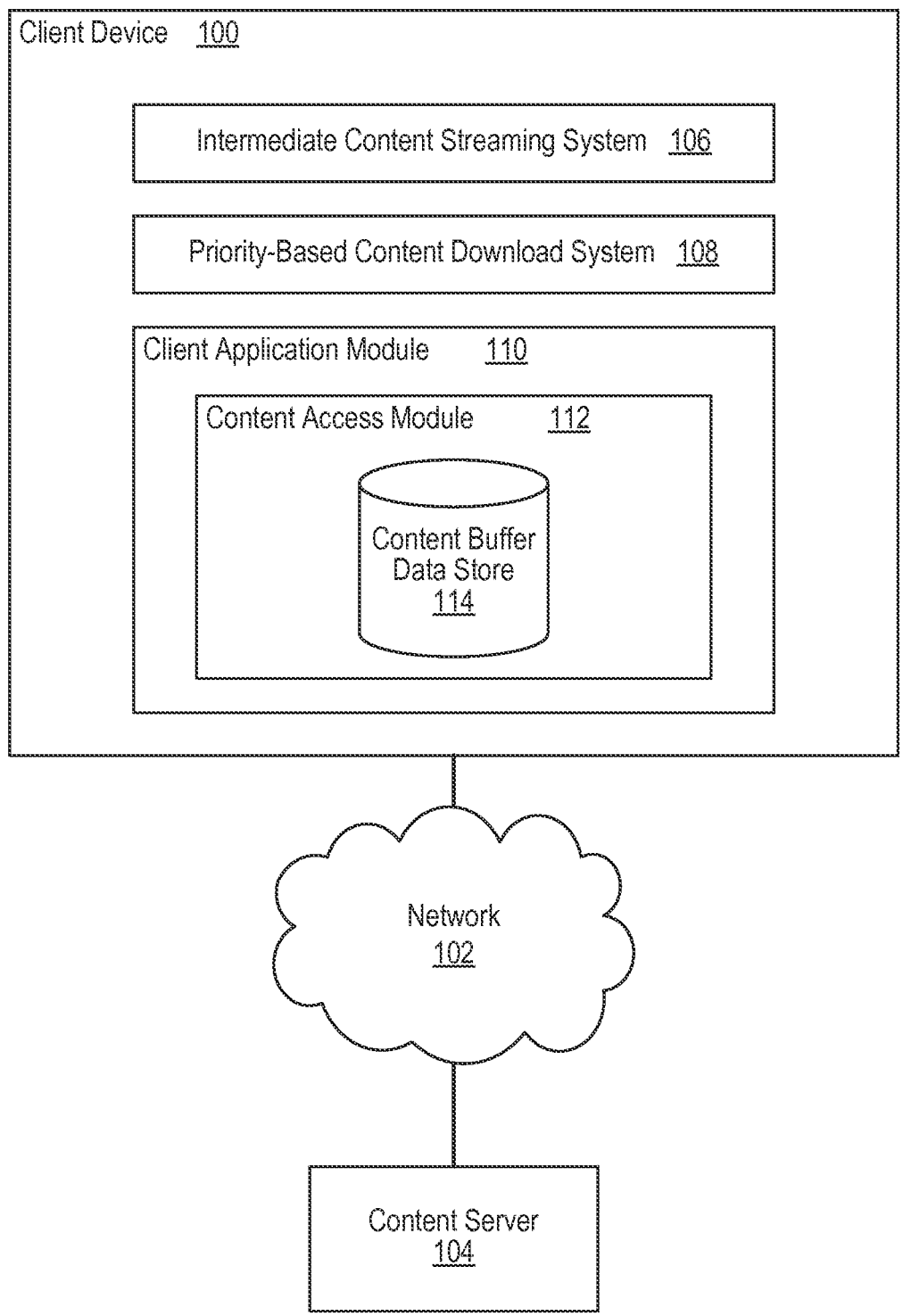
FIG. 1 illustrates an example intermediate content streaming system and an example priority-based content download system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Social networking users, or providers of digital content (or "content"), may wish to distribute digital content through a social networking system. For example, advertisers may wish to distribute advertisements with digital content items (or "content items"), such as videos or interactive presentations, to users of a social networking system. For instance, movie studios may wish to provide movie trailers to users of a social networking system. Similarly, music companies, book publishers, video game publishers, and others may wish to make digital content items of some form available to users of a social networking system. Additionally, users of the social networking system may share digital content items amongst themselves, such as by including a link to a streaming video in their social networking posting, or by embedding streaming audio content in a social networking posting.

However, distributing digital content through a social networking system may be difficult to accomplish. Often times, digital content items include large amounts of data. A simple video advertisement appearing in a social networking newsfeed, for example, may include image data for each still image frame, audio data, interactive hyperlinks, and other content data. Users may attempt to access the social networking system through various types of networks, including 802.11 Wi-Fi, Third Generation (3G), Fourth Generation (4G), and Fifth Generation (5G) networks, each of which tends to have different performance characteristics (e.g., data speed, bandwidth, and throughput). Streaming a digital content item to a user accessing a wireless network may provide the user with a relatively lower-quality version of the digital content item than otherwise possible, or may result in delays in accessing the streaming content (e.g., jitter).

Techniques provided herein implement systems and methods that can improve access to content items from an online content source by a client device. According to some embodiments, an intermediate content streaming system is implemented on a client device for caching digital content locally at the client device as the content is streamed to the client device from an online content source (e.g., content server) over a network. As used herein, a content item may comprise content of one or more types including, for example, text, audio, video, images, presentations, and the like. Through the intermediate content streaming system at the client device, a content access application at the client device, such a multimedia player, can request and subsequently receive some or all of a content item (e.g., video) as a stream of content data (e.g., video data). In particular, the intermediate content streaming system may receive a request for a content item provided by an online content source, and the intermediate content streaming system in turn can provide some or all of the content item (e.g., audio) to the content access application as a stream of content data (e.g., audio data). This may be accomplished by the intermediate content streaming system requesting and obtaining the content data from the online content source on behalf of the content access application. The content data from the online content source may be received by the intermediate content streaming system as a data stream. As the content data for the requested content item is streamed from the online content source to the intermediate content streaming system, the intermediate content streaming system can provide the content data to the content access application. Further, as the intermediate content streaming system receives the streamed content data from the online content source, it can locally cache the streamed content data at the client device and maintain the cached content data for the benefit of future requests for the same content item.

The request received by the intermediate content streaming system from the content access application may utilize various types of network protocols, including HTTP, FTP, RTP, and the like. Likewise, the request sent from the intermediate content streaming system to the online content source may utilize various types of network protocols. In some embodiments, the request sent from the intermediate content streaming system to the online content source may be similar to, or correspond in format to, the request the intermediate content streaming system receives from the content access application. Depending on the embodiment, an intermediate content streaming system may be implemented as a server process operating locally at a client device.

Thereafter, when the intermediate content streaming system receives a request for the content item previously streamed through the intermediate content streaming system (e.g., a request by the same content access application as before or by another content access application at the client device), the intermediate content streaming system can fulfill the request by providing from the local cache content data corresponding to those portions of the content item previously received by the intermediate content streaming system. The intermediate content streaming system can also fulfill the request by requesting from the online content source, and then providing the content access application with, content data for those portions of the content item not previously received by the intermediate content streaming system. In this way, the intermediate content streaming system can enable independent content access applications at the client device to benefit from content data already locally cached at the client device during previous streaming sessions of the content item. Depending on the request, the intermediate content streaming system may be configured to provide a content access application at the client device with content data for a content item based on a specific seek time (e.g., a time later than the beginning of the video), thereby obviating the need for the intermediate server to request and receive the content item from the beginning or in its entirety. Additionally, depending on the embodiment, the intermediate content streaming system may provide the content data as a data stream, and the data stream provided by the intermediate content streaming system may be similar (e.g., in format or protocol) to the data stream that provides the content data from the online content source to the intermediate content streaming system.

According to some embodiments, the cache is separate and maintained independently from the buffer of content access applications at the client device (e.g., streaming video player). Such buffers are typically used by content access applications for temporary data storage of content data as the content is streamed and accessed by the content access applications.

As used herein, a content access application can include any type of multimedia player, such as an audio player, a video player, or a presentation player (e.g., slide show or vector-based graphics). A content access application can also include various types of content editor, such as multimedia editors (e.g., audio or video editor) or document editors (e.g., word processing application). Additionally, content access applications can be implemented as one or more software modules that can be utilized by other stand-alone applications, such as web browsers, when accessing content compatible with the content access application. For example, a content access application can include a stand-alone video player or a video player module utilized by a web browser when accessing a video embedded in a web page (e.g., video embedded in a posting or a message presented on a web page of a social network). A content access application may be limited to accessing one or more specific types of content. Accessing visual content can include presenting the visual content, such video or presentation content, on a display of the client device. Accessing audio content can include outputting audio content, such an audio content in a video, through a speaker of the client device.

As used herein, an online content source may refer to a computer system, such as a server, configured to provide one or more content items to a requesting client device over a network connection. The online content source may be configured to provide the content as a data stream, which may enable a client device to access portions of the content item as they are received (rather than having to wait until all portions of the content item are received at the client device).

Depending on the embodiment, an original request from a content access application to an online content source for a content item may be addressed to, forwarded to, or intercepted by, the intermediate content streaming system. For instance, the content access application may be configured to send requests for content items from online content sources directly to the intermediate streaming content system. The intermediate streaming content system, in turn, can provide content data for the requested content item to the content access application from a local cache to the extent available, can obtain content data not present in the local cache from the online content source and then provide the obtained content data to the content access application, or both.

According to some embodiments, a priority-based content downloading system is implemented on a client device to facilitate priority-based pre-downloading of content items (e.g., streaming content items) to the client device before a user at the client device is presented with access to the content items, such as through a news feed provided by a social networking system. For example, the priority-based content downloading system can partially or wholly pre-download, to the client device, videos appearing in postings to a social networking system (e.g., online videos embedded in social postings) before the user encounters such postings (e.g., views such postings). A user may encounter such postings in a social network news feed, where one or more news items (hereafter, "news postings") include one or more online content items (e.g., online videos) provided by the content server. As a user views the news feed, content items included in one or more news postings of the news feed can be pre-downloaded, in whole or in part, to the client device before such news postings are made accessible to the user (e.g., become visible to the user on the client device) through the news feed.

Once a content item is pre-downloaded to the client device by the priority-based content downloading system, it may be stored to a local cache of the client device. According to some embodiments, a priority-based content download system described herein may utilize the same local cache as an intermediate content stream system described herein. By sharing the local cache in this manner, an intermediate content streaming system on a client device can interoperate with a priority-based content download system on the same client device. For example, before a content item is presented for access on a client device, a priority-based content download system can pre-download at least some of the content item to a local cache shared with an intermediate content streaming system, and do so before a request for the content item is received by the intermediate content streaming system. Subsequently, when a request for the content item is received by the intermediate content streaming system, the request can be fulfilled by the intermediate content streaming system using the portions of the content item pre-downloaded to the local cache by the priority-based content download system.

The prioritization of content pre-downloads can be based on various factors including, without limitation: whether the content item is one that is auto-played in a social networking news feed when encountered by the user (e.g., when the video comes into the user's view through their social networking news feed); how many social networking likes or comments are associated with the content item; quality of social networking likes or comments associated with the content item (e.g., who has liked or commented on the video); details regarding the client device (e.g., hardware or software specification); computing resources available at the client device (e.g., memory); the probability that the content item will be encountered by the user (e.g., likelihood the video will come into the user's view through their social networking posting feed); the subject matter of the content item (e.g., advertisement or non-advertisement); and user-preferences for accessing (e.g., playing) content item. A priority-based content download system may be implemented as a server process operating locally at a client device.

FIG. 1 illustrates an example intermediate content streaming system 106 and an example priority-based content download system 108 in accordance with an embodiment of the invention. As shown, a client device 100 includes the intermediate content streaming system 106, the priority-based content download system 108, and a client application module 110. Though FIG. 1 depicts the client device 100 as have both the intermediate content streaming system 106 and the priority-based content download system 108, for some embodiments the client device 100 includes only one (e.g., the intermediate content streaming system 106) and not the other (the priority-based content download system 108).

As also shown, the client device 100 is communicatively coupled to a content server 104 through a network 102. Depending on the embodiment, the client device 100 may be a desktop computer, laptop computer, a tablet computing device, a data-enabled mobile phone, or some other network-enabled device, capable of exchanging data, such as content data, with the content server 104 over the network 102. The network 102 may support various network protocols and may include a communications network, such as a computer network. The network 102 may comprise one or more wired or wireless networks, including 802.11 Wi-Fi, Third Generation (3G), Fourth Generation (4G) networks, and Fifth Generation (5G) networks, each providing different data speeds, bandwidth, and throughput. The network 102 may provide content items from the content server 104 to one or more of the intermediate content streaming system 106 and the priority-based content download system 108. Depending on the embodiment, the network 102 may facilitate coupling of internal components within one or more of the client device 100, the intermediate content streaming system 106, the priority-based content download system 108, and the content server 104.

In describing the intermediate content streaming system 106 and the priority-based content download system 108, it would be useful to first describe the client application module 110 of the client device 100. According to some embodiments, the client application module 110 is a software-based component or a standalone application configured to facilitate interaction between a user and the client device 100. For example, the client application module 110 may be a standalone application configured to operate on the client device 100 and that permits the user to access a social networking system and interact with various provided therein. As described herein in further detail, a social networking system may be utilized to distribute or share content items amongst one or more social networking users.

As shown, the client application module 110 includes a content access module 112 to facilitate access to one or more types of content items through the client application module 110. Though the content access module 112 is depicted in FIG. 1 as being included by the client application module 110, the content access module 112 may be a software-based component or a standalone application configured to operate on the client device 100 and that facilitates access to one or more content types. For instance, the content access module 112 may be a software component external to the client application module 110 and employed by the client application module 110 when a user at the client device 100 is accessing a content item through the client application module 110. For example, the client application module 110 may be a web browser that is accessing a web page of a social networking system, and the client application module 110 may utilize a content access module 112, such as a multimedia player, to access a multimedia content item (e.g., audio or video) embedded in the web page.

As used herein, accessing a content item can include opening the content item, and reading, writing, or editing content data associated with the content item. For instance, accessing a video content item may comprise opening the video content item, reading the video content data associated with the video content item, and displaying the video content data in a display coupled to the client device 100. Methods for accessing content items may vary among content types. Where the content item is located remotely from the client device 100 (e.g., located at the content server 104) and received through the network 102 (e.g., from the content server 104), the content access module 112 may access the content item by way of a data stream (hereafter, "content data stream") transmitted over the network 102. The content access module 112 may facilitate such stream-based access of the content item by storing (e.g., committing) at least some of the content item received through the associated content data stream to a content buffer data store 114. For example, to access a content item streamed from the content server 104 to the client device 100, the content data stream received from the content server 104 may be first stored to the content buffer data store 114, and the content access module 112 may access the content data stored to the content buffer data store 114 to access the portions of the content item corresponding to the content data stored. As described herein in further detail, the content access module 112 may receive the data stream through the intermediate content streaming system 106, the priority-based content download system 108, or some combination of both.

The content buffer data store 114 can enable the content access module 112 to buffer a certain amount of a content item before it is accessed, thereby facilitating smoother or more contiguous access to the content item by a user at the client device 100. For example, the content buffer data store 114 may enable the content access module 112 to buffer the first 10 seconds of a streamed video before the video is accessed (e.g., played) or made accessible (e.g., made playable) to the user at the client device 100. The content buffer data store 114 may be particularly useful where the content access module 112 is accessing a content item from the content server 104 as a content data stream over the network 102, which is susceptible to network conditions that can cause inconsistent content data streams (e.g., packet delays, packet errors, temporary loss of network connections, or degradation of network speeds).

The content buffer data store 114 may be configured to temporarily store content data for at least those portions of the content item currently being accessed by the user through the content access module 112. In addition, the content buffer data store 114 may be configured to temporarily store content data for those portions of the content item recently accessed by the user through the content access module 112, thereby enabling re-access to such portions without the need for re-retrieval from the online source (e.g., the content server 104).

To implement temporary data storage, the content buffer data store 114 may remove (e.g., purge) content data based on storage limit, data age, last access time, frequency of access, type of content data, correspondence to portions of the content item, the priority of the content item to which the content data correspondence, or the like. For example, content data may be expelled from the content buffer data store 114 when total content data currently stored on the content buffer data store 114 has met or exceeded the storage limit. In another example, the content data may be expelled from the content buffer data store 114 based on when the content data was received (e.g., received 30 second ago), or when the content data corresponds to portions of a content item accessed in the past (e.g., corresponds to portions accessed more than 30 second ago).

The intermediate content streaming system 106 may be configured to cache content items locally at the client device as content data for the content items is streamed to the client device 100 from the content server 104 over the network 102. The content access module 112 at the client device 100, which may be included in the client application module 110, can request a content item from the content server 104 by way of the intermediate content streaming system 106, and the intermediate content streaming system 106 in turn can provide some or all of the content item (e.g., audio) to the content access module 112 as a stream of content data (e.g., audio data). This may be accomplished by the intermediate content streaming system 106 requesting and obtaining the content data from the content server 104, over the network 102, on behalf of the content access module 112. The content data from the content server 104 may be received by the intermediate content streaming system 106 as a data stream. As the content data for the requested content item is streamed from the content server 104 to the intermediate content streaming system 106, the intermediate content streaming system 106 can provide the content data to the content access module 112. Additionally, as the intermediate content streaming system 106 receives the streamed content data from the content server 104, it can locally cache the streamed content data at the client device 100 (e.g., stored to a content cache data store included by the system 106) and maintain the cached content data for the benefit of future requests for the same content item. The intermediate content streaming system 106 may provide the content access module 112 with the streamed content data before or after with the content data has been locally cached at the client device 100, or concurrent with the content data being locally cached at the client device 100. When providing the content data for the requested content item to the content access module 112, the intermediate content streaming system 106 may provide the content data as a data stream. Additionally, the data stream from the intermediate content streaming system 106 to the content access module 112 may be may be similar in format or protocol to the data stream that provides the content data for the requested content item from the content server 104 to the intermediate content streaming system 106.

In accordance with some embodiments, the cached content data is retained independent of content data retained in buffers of various content access modules on the client device 100. Additionally, according to some embodiments, the cached content data is retained for a longer duration than the duration a buffer of a content access module retains content data. Depending on the embodiment, the intermediate content streaming system 106 may be implemented as a server process operating locally at the client device 100.

The request received by the intermediate content streaming system 106 from the content access module 112 may utilize various types of network protocols, including HTTP, FTP, RTP, and the like. Similarly, the request sent from the intermediate content streaming system 106 to the content server 104 may utilize various types of network protocols. For some embodiments, the request sent from the intermediate content streaming system 106 to the content server 104 may be similar to, or correspond in format to, the request the intermediate content streaming system 106 receives from the content access module 112 for the content item.

Subsequent to locally caching content data received in connection with a content item being streamed to the client device 100 from the content server 104, the intermediate content streaming system 106 may receive another request for the same content item. This other request may come from a content access module at the client device 100 that previously requested the same content item (e.g., the content access module 112), or by another client access module at the client device 100. The intermediate content streaming system 106 can fulfill the request by providing from the local cache content data corresponding to those portions of the content item previously received by the intermediate content streaming system 106. The intermediate content streaming system 106 can also fulfill the request by requesting from the content server 104, and then providing the requesting content access module (e.g., the content access module 112) with, content data for those portions of the content item not previously received by the intermediate content streaming system 106. In this way, the intermediate content streaming system 106 can enable independent content access modules at the client device 100 to benefit from content data already locally cached at the client device during previous streaming sessions of the content item.

For example, a user may select to preview a streaming video content item, provided by a social networking system, through the client application module 110 using the content access module 112. The content access module 112 may be configured to provide a less-than-full-screen view of the streaming video content item as the user previews the streaming video content item. Subsequently, the user may select to view the streaming video content item through the client application module 110 using a second content access module (now shown), which provides a full-screen view of the streaming video content item on the client device 100. When the second content access module requests access to the same streaming video content item, the intermediate content streaming system 106 can provide from its local cache those portions of the streaming video content item already received during previous streaming sessions to the client device 100 involving the streaming video content items. The portions used could include those portions received during the previous session involving the preview through the content access module 112.

Depending on the request, the intermediate content streaming system 106 may be configured to provide a content access module (e.g., the content access module 112) at the client device 100 with content data for a content item based on a specific seek time (e.g., a time later than the beginning of the video), thereby obviating the need for the intermediate server to request and receive the content item from the beginning or in its entirety. For example, based on a selection by a user at the client device 100, the content access module 112 may transmit a request to access a specific portion of a streaming video content item provided by the content server 104, where the portion corresponds to a specific time position (e.g., specific minutes and seconds) in the streaming video content item. The intermediate content streaming system 106 may receive the request and identify, based on the request, what content data needs to be provided to the content access module 112 to fulfill the request for the specific portion corresponding to the specific time position. For instance, based on the identified content data, the intermediate content streaming system 106 may provide content data to the content access module 112 from its local cache, obtain the content data from the content server 104 and then provide the obtained content data to the content access module 112; or do both.

Depending on the embodiment, an original request from the content access module 112 to the content server 104 for a content item may be addressed to, forwarded to, or intercepted by, the intermediate content streaming system 106. For instance, the content access application may be configured to send requests for content items provided by online content sources (e.g., the content server 104) directly to the intermediate content streaming system 106. The intermediate content streaming system 106, in turn, can provide content data for the requested content item to the content access module 112 from a local cache to the extent available, can obtain content data not present in the local cache from the content server 104 and then provide the obtained content data to the content access module 112, or both. In this way, the intermediate content streaming system 106 can request content data from the content server 104 on behalf of the content access module 112, and other content access modules on the client device 100, when content data required to fulfill a content access module's request is not locally cached.

The priority-based content download system 108 may be configured to facilitate priority-based pre-downloading of content items to the client device 100 before a user at the client device 100 is presented with access to the content items. For example, streaming online content items (e.g., video content items) appearing in postings to a social networking system can be partially or completely pre-downloaded by the priority-based content download system 108 to the client device 100 before the user at the client device 100 encounter such postings (e.g., views such postings). A social network user at the client device 100 may encounter such postings in a social network news feed, where one or more news postings include one or more online content items. As a user views the news feed through the client application module 110, content items included in one or more news postings of the news feed can be pre-downloaded, in whole or in part, to the client device 100 before such news postings are made accessible to the user (e.g., of the news feed) through the news feed.

Once a content item is pre-downloaded to the client device 100 by the priority-based content download system 108, it may be stored to a local cache of the client device 100. According to some embodiments, the priority-based content download system 108 utilizes the same local cache as the intermediate content streaming system 106. By sharing the local cache in this manner, the intermediate content streaming system 106 can interoperate with the priority-based content download system 108. For instance, before a content item is presented for access on the client device 100, the priority-based content download system 108 can pre-download at least some of the content item to the local cache shared with the intermediate content streaming system 106, and do so before a request for the content item is received by the intermediate content streaming system 106. Subsequently, when a request for the content item is received by the intermediate content streaming system 106, the request can be fulfilled by the intermediate content streaming system 106 using the portions of the content item pre-downloaded to the local cache by the priority-based content download system 108.

As described herein in further detail, the prioritization of content pre-downloads can be based on various factors including, without limitation: whether the content item is one that is auto-played in a social networking news feed when encountered by the user at the client device 100; how many social networking likes or comments are associated with the content item; quality of social networking likes or comments associated with the content item; details regarding the client device 100; computing resources available at the client device 100; the probability that the content item will be encountered by the user at the client device 100; the subject matter of the content item; and user-preferences for accessing content item. The priority-based content download system 108 may be implemented as a server process operating locally at the client device 100.

The content server 104 may provide content items, such as audio, video, or other multimedia content items, to the client device 100 over the network 102. As described herein in further detail, content items may include text, images, audio, video, interactive content items, and the like. The content items can include advertisements, such as audio or video advertisements, and can include content items commonly shared by users over a network, such as online audio or video streams. Content items can also be embedded into other content items, such a video embedded into a text message. The content items can also include hyperlinks to music files, video files, documents, and the like, which may be provided by the content server 104 to the client device 100 over the network 102. In this way, the content server 104 need not provide actual content items (e.g., music, video, documents, etc.) but, rather, cam provide links to network locations of content items available by an online content resource, such as a cloud-based service or a server. In some embodiments, including a hyperlink to a first content item within a second content item results in the first content item being embedded into the second content item.

The content items can include those that are traditionally downloaded or those traditionally streamed to the client device 100. For example, access to a multimedia file provided online can be facilitated by way of a data stream to a client device, or by way of first downloading the multimedia file to the client device first and then facilitating access to the downloaded multimedia file at the client device. Accordingly, in some embodiments, content items (e.g., an audio or video file) may be provided by the content server 104 to the client device 100 as a stream of content data. Upon receiving streamed content data from the content server 104, the client device 100 may provide the streamed content data to the content access module 112 through the intermediate content streaming system 106, the priority-based content download system 108, or both, as described herein. The content access module 112 in turn may temporarily store the streamed content data to the content buffer data store 114, and the content access module 112 may provide a user at the client device 100 with access to those portions of the content item corresponding to the data in the content buffer data store 114.

Figure 7:
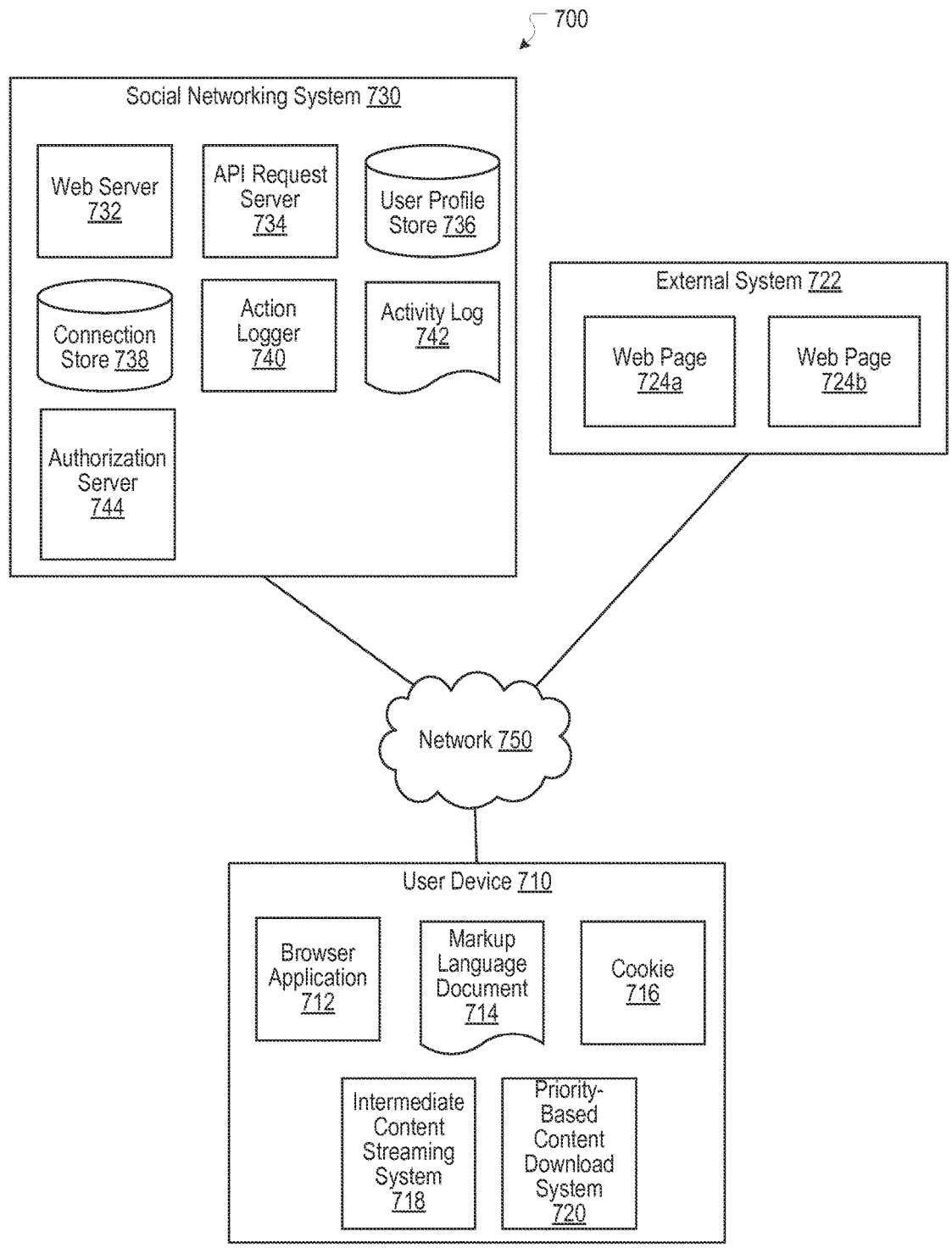
FIG. 7 illustrates an example of a network diagram of system for intermediate content streaming and priority-based content download in a social networking environment in accordance with an embodiment of the invention.

In some embodiments, the content server 104 is incorporated into a social networking environment 700, as shown in FIG. 7. For example, the content server 104 may be implemented by an external system, such as the one having reference numeral 722 in FIG. 7. Additionally, the intermediate content streaming system 106, the priority-based content download system 108, or both can be incorporated into a social networking environment 700, as shown in FIG. 7 by reference numerals 718 and 720 respectively.

The components shown in FIG. 1, and all figures herein, are exemplary only, and other embodiments may include additional, fewer, or different components. As another example, it will be understood that some embodiments may include two or more client devices, or two or more content servers. Additionally, some components may not be shown in FIG. 1, and other figures herein, so as not to obscure relevant details.

Figure 2:
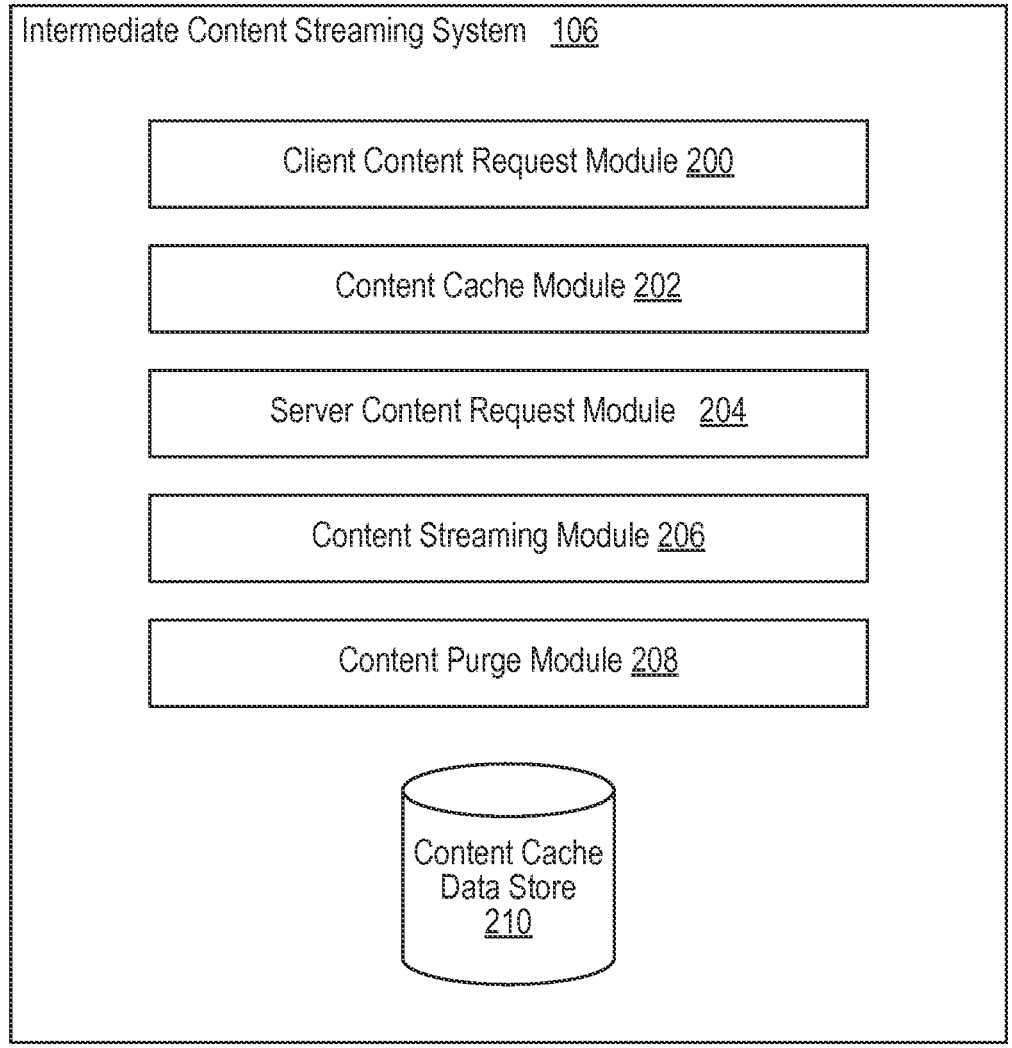
FIG. 2 illustrates an example intermediate content streaming system in accordance with an embodiment of the invention.

FIG. 2 illustrates the intermediate content streaming system 106 in accordance with an embodiment of the invention. In FIG. 2, the intermediate content streaming system 106 includes a client content request module 200, a content cache module 202, a server content request module 204, a content streaming module 206, a content purge module 208, and a content cache data store 210. In accordance with some embodiments, the content cache data store 210 serves as a local cache for the client device (e.g., the client device 100) being serviced by the intermediate content streaming system 106. For some embodiments, the content cache data store 210 serves as a local cache shared between the intermediate content streaming system 106 and a priority-based content download system described herein. The components shown in FIG. 2 may include additional, fewer, or different components. Additionally, some components may not be shown in FIG. 2 so as not to obscure relevant details.

The client content request module 200 may be configured to receive a request from a client access module for a content item, where the content item is provided by a content server over a network. Depending on the embodiment, the client content request module 200 may receive the request directly from the client access module, by way of a forward, or by way of interception. The request received may be one comprising various network protocols, including HTTP, FTP, and RTP. The client content request module 200 may be also configured to analyze the request received and obtain information that may be used in fulfilling the request. For example, by analyzing the request, the client content request module 200 can identify the content item being requested, identify the content server from which the content item is sought, identify the type of request, or identify the specific requested portions of the content item (e.g., time position in the content item).

Based on the request analysis, the client content request module 200 may identify a first set of content data corresponding to one or more of the identified portions of the content item that are stored on the content cache data store 210. Where no content data in the content cache data store 210 corresponds to the identified portions of the content item, the first set of content data may be empty or the first set of content data may not be generated. Additionally, based on the request analysis, the client content request module 200 may also identify a second set of content data corresponding to one or more of the identified portions of the content item that are not stored on (or missing from) the content cache data store 210. Where all of the content item has already been received and stored to the content cache data store 210 (e.g., during previous content streaming sessions), the second set of content data may be empty, or the second set of content data may not be generated.

Identifying the first set of content data, the second set of content data, or both may comprise checking the content cache data store 210 for stored content data corresponding to the content item being requested, and determining whether the content data stored corresponds to the specific portions requested by the content access module. In addition, identifying the second set of content data may comprise comparing what the content data stored at the content cache data store with content data available from the content server from which the content item is being requested by the content access module.

The content cache module 202 may be configured to facilitate access to the content cache data store 210. For example, the content cache module 202 may be utilized to determine what content data is stored on the content cache data store 210, determine what content data is missing from the content cache data store 210, facilitate storage of content data to the content cache data store 210 (e.g., as received from the content server 104), or facilitate removal of content data from the content cache data store 210 (e.g., by the content purge module 208). The content cache module 202 may also obtain information regarding the content data stored on the content cache data store 210 including, but not limited to, content data age, time of last access, metadata, and the like. The content cache module 202 may further be utilized to obtain and provide the intermediate content streaming system 106 with content data to be provided to the content access module in response to the request by the content access module.

The server content request module 204 may be configured to generate and submit a request to the content server for the second set of content data corresponding to identified portions of the content item missing from the content cache data store 210. According to some embodiments, the server content request module 204 submits the request for the second set of the content data and receives, in response, some or all of the second set of content data requested. The request submitted by the server content request module 204 may be similar in format or protocol to the request originally received by the client content request module 200 from the content access module of the client device. Upon receiving the content data from the content server, the server content request module 204 may store the received content data to the content cache data store 210 (e.g., via the content cache module 202) before it is provided to the content access module requesting the content item (e.g., via the content streaming module 206).

The content streaming module 206 may be configured to provide content data, received at the intermediate content streaming system 106, to the content access module requesting the content item as a data stream. According to some embodiments, the content streaming module 206 generates and then provides a content data stream, which may be similar to format or protocol to the content data stream received from the content server in response to requests by the server content request module 204. The content data stream may comprise content data provided by the content cache module 202 from the content cache data store 210, obtained and provided by the server content request module 204 from the content server providing the requested content item, or both. According to some embodiments, content data obtained by the server content request module 204 is first stored to the content cache data store 210 (e.g., via content cache module 202), and the content streaming module 206 generates a content data stream from the content data being stored to the content cache data store 210.

The content purge module 208 may be configured to content data stored at the content cache data store 210 a number of factors including, without limitation, the storage limit of the client device, age of the content data, last access time of the content data, frequency of access of the content data, type of content data, correspondence to portions of the content item, the priority of the content item to which the content data corresponds, or the like. According to some embodiments, the content purge module 208 purges content data corresponding to a first content item having a lower priority before purging content data corresponding to a second content item having a higher priority. Further detail regarding determining the priority of a content item is described herein.

Figure 3:
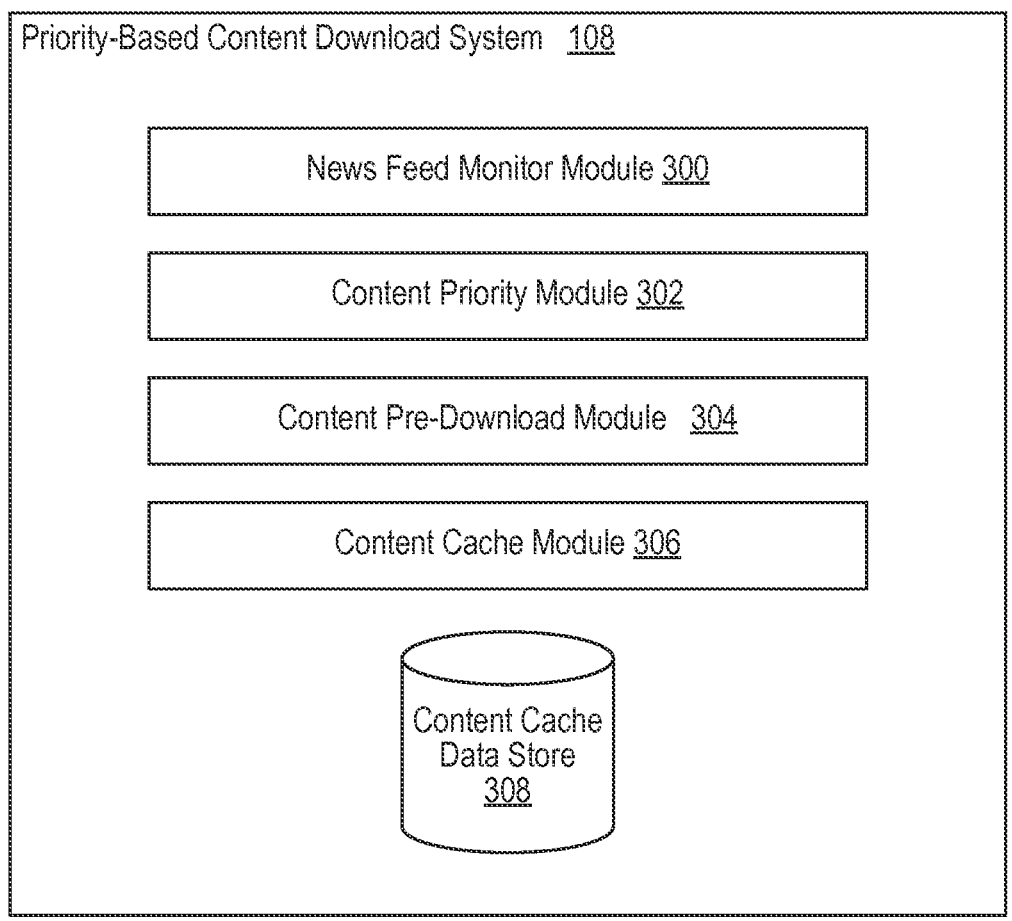
FIG. 3 illustrates an example priority-based content download system in accordance with an embodiment of the invention.

FIG. 3 illustrates the priority-based content download system 108 in accordance with an embodiment of the invention. In FIG. 3, the priority-based content download system 108 includes a news feed monitor module 300, a content priority module 302, a content pre-download module 304, and a content cache module 306, and a content cache data store 308. In accordance with some embodiments, the content cache data store 308 serves as a local cache for the client device (e.g., the client device 100) being serviced by the priority-based content download system 108. For some embodiments, the content cache data store 308 serves as a local cache shared between the priority-based content download system 108 and an intermediate content streaming system described herein. The components shown in FIG. 3 may include additional, fewer, or different components. Additionally, some components may not be shown in FIG. 3 so as not to obscure relevant details.

The news feed monitor module 300 may be configured to monitor a news feed for one or more content items made accessible to a user through the news feed. As described herein in further detail, a news feed can comprise one or more news postings, each of which may include one or more content items. The news feed monitored may be one provided by a social networking system, and accessible through a standalone application, such a social networking application or a web browser accessing a social networking web page. The content items being monitored for by the news feed monitor module 300 may be those currently visible to a user through the news feed (e.g., one included in a news posting currently visible to the user), those scheduled to be presented through the news feed, or both.

During monitoring, the news feed monitor module 300 can identify one or more content items scheduled to be presented to a user through the news feed. As described herein in further detail, a content item scheduled to be presented through the news feed can be one included in a news posting scheduled to be presented on a news feed. Additionally, a news posting scheduled to be presented on a news feed can be one that has yet to be added to the news feed, one that has yet to be added back to the news feed after a previous removal from the news feed, one that has already been added to the news feed but has yet to be viewed through the news feed by a user, or one that has already been viewed at least once through the news feed by the user but is currently not in view of the user. The news feed monitor module 300 may be configured to detect one or more content items periodically or continuously. Where the news feed is provided by a social networking system, the news feed monitor module 300 may monitor the news feed for content items using social graph data maintained by the social networking system.

The content priority module 302 may be configured to determine the priority of a given content item based on factors relating to the content item. Depending on the embodiment, the priority of a content item can be used to determine order of pre-downloading content items (e.g., a content item with the higher priority pre-downloads first), order in which content data locally cached should be purged from a client device (e.g., content data for a content item with lower priority is purged first), or whether a content item should be pre-downloaded (e.g., based on whether the priority of a content item meets a threshold for pre-download). In some embodiments, the priority can determine other operations with respect to a given content item. Determining a priority for a content item can be based on any number of factors including, without limitation: whether the content item is auto-played when visible to the user; whether the content item is associated with an advertisement; a preference of the user; availability of a resource of the client device (e.g., memory, processor speed, network bandwidth, etc.); a content type of the content item (e.g., streaming video, audio, or presentation); metadata of the first content item (e.g., author, publishers, subject matter, title, etc.); the social networking information associated with the content item. For some embodiments, the social networking information comprises a quantity of likes of the content item by social network users on a social network (e.g., higher priority for content items liked by social network users that are friends or close family members), a quantity of shares of the content item by social network users on a social network (e.g., the more likes, the more popular the content item, thus the higher the priority), or a quantity of comments associated with the content item by social network users on a social network (e.g., the more comments, the more interesting the content item, thus the higher the priority). The social networking information may identify one or more social network users who have liked the first content item on a social network, identify one or more social network users who have shared the first content item on a social network, or identify one or more social network users who have commented on the first content item on a social network. The social information used for determining a priority of a content item may be provided by a social graph maintained by a social networking system to support its various features.

The content pre-download module 304 may be configured to pre-download, in whole or in part, one or more content items to a client device, where the content items are scheduled to be presented in the news feed being monitored by the news feed monitor module 300. Additionally, the content pre-download module 304 may be configured to pre-download, in whole or in part, one or more content items to the client device before a client access module on the client device requests access to the client items. As described herein in further detail, once the content data of the content items are pre-downloaded to the client device by the content pre-download module 304, it can be stored to the content cache data store 308. Subsequently, a content access module requesting access to the pre-downloaded content item can be provided with content data from the content cache data store 308, to the extent possible. In this way, access to at least the pre-downloaded portions of the content item may quicker than when having to obtain content data for the content item directly from the content server. Where less than all of the content data associated with the content item has been stored to the content cache data store 308, the content access module may obtain need content data directly from the content server, through an intermediate content streaming system described herein, or by using some combination of both.

Depending on the embodiment, how much of a given content item is pre-downloaded by the content pre-download module 304 may depend on various factors including, without limitation: user preferences (e.g., pre-download only first 30 second); system preferences (e.g., social networking system default settings); overall size of the content item, the type of content item (e.g., video or audio content item); priority of the content item (e.g., as determined by the content priority module 302); availability of resources of the client device (e.g., memory, processor speed, network bandwidth, etc.); relevance to the user at the client device; and the likelihood of interest by the user at the client device. For instance, content items having high priority may have more content data are pre-downloaded than content items having low priority.

The content cache module 306 may be configured to facilitate access to the content cache data store 308. For instance, the content cache module 306 may be utilized to determine what content data is stored on the content cache data store 308, determine what content data is missing from the content cache data store 308, facilitate storage of content data to the content cache data store 308 (e.g., as received pre-downloaded by the content pre-download module 304), or facilitate removal of content data from the content cache data store 308. The content cache module 306 may also obtain information regarding the content data stored on the content cache data store 308 including, but not limited to, content data age, time of last access, metadata, and the like.

Though FIG. 3 is depicted and described with respect to a news feed, in some embodiments, the priority-based content download system 108 is utilized with other methods for distributing content items including, but limited to, content items provided through standalone applications or content items embedded into web pages viewable by a web browser.

Figure 4:
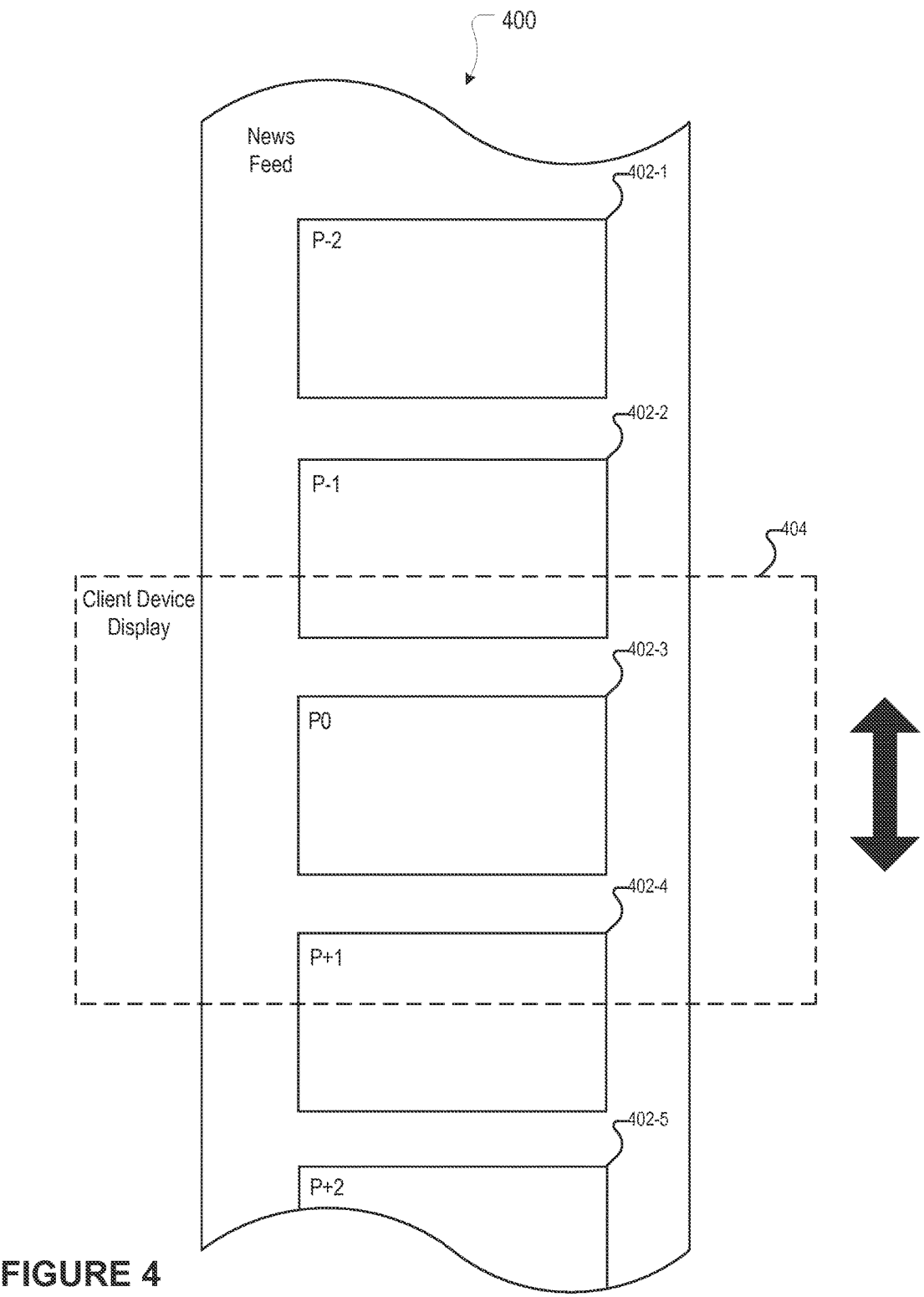
FIG. 4 illustrates an example news feed used in accordance with an embodiment of the invention.

FIG. 4 illustrates an example news feed 400 used in accordance with an embodiment of the invention. The news feed 400 may be one provided by a social networking system, and may be configured to provide one or more news items (hereafter, "news postings") each of which describe one or more events detected or posted to the social networking system. For example, the news feed 400 may include one or more news posting based on nodes, edges, or coefficients of social graph data that supports the social networking system.

As described herein in further detail, a social networking system can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system. Additionally, the social graph may include coefficients that reflect weights for paths between nodes in the social graph, and that serve as measures of relatedness between nodes in the social graph (e.g., based on weight, coefficients may indicate that a user is closer to her best friend than to another person befriended by the user). Accordingly, based on nodes, edges, or coefficients included the social graph data, the news feed 400 may be populated with one or more news postings according to those news postings relation to a given node in the social graph of the social networking system. For instance, the news feed 400 may be a custom social networking news feed generated with respect to a node representing a particular social networking user.

As shown in FIG. 4, the news feed 400 includes a plurality of news postings 402-1, 402-2, 402-3, 402-4, and 402-5 (hereafter, "news postings 402"). The news feed 400 may be provided by way of a social networking system, and accessible through a standalone application, such a social networking application or a web browser accessing a social networking web page. In FIG. 4, the news postings P−1 and P−2 may be news postings already viewed by a user through a client device display 404, while the news postings P+1 and P+2 may be news postings scheduled to be presented through the client device display 404 for access by a user of the client device. Depending on the embodiment, the news postings 402 can be viewed according to the sequence in which they are posted in the news feed 400. As used herein in further detail, a news posting or a content item scheduled to be presented on a news feed may include, for example, one that has yet to be added to the news feed, one that has yet to be added back to the news feed after a previous removal from the news feed, one that has already been added to the news feed but has yet to be viewed through the news feed by a user, or one that has already been viewed at least once through the news feed by the user but is currently not in view of the user.

Depending on the embodiment, each of the news postings 402 can include one or more content items. When including content items, the news postings 402 may include the content items by way of a hyperlink, by way of embedding the content items into the content of the news posting, or both. In the context of a social networking system, the news feed 400 may be updated with additional news postings based on various factors, including one or more changes to the social graph data supporting the social networking system, or the behavior of a social networking user currently viewing the news feed 400. Changes to the social graph data can include when social network events are added as nodes to the social graph data. Based on the relation of those added nodes to the social networking user currently viewing the news feed 400, the news postings may be added to the news feed 400.

As also shown in FIG. 4, the news feed 400 is positioned with respect to a client device display 404 such that a certain portion of the news feed 400 is visible through the client device display 404. As shown in FIG. 4, the position of the news feed 400 with respect to the client device display 404 can cause, a user viewing the news feed 400 through the client device display 404 to only see news posting P0, the bottom of news posting P−1, and the top of posting P+1. As the user repositions the news feed 400 vertically with respect to the client device display 404 (e.g., scrolls up or down the news feed 400 based on user input to the client device), the visibility of some or all of the news postings 402 by a user at the client device display 404 may increase or decrease. Additionally, as the user repositions the news feed 400 vertically with respect to the client device display 404, the news feed 400 may be automatically populated with additional news postings, depopulated of news postings currently on the news feed 400, or both. For instance, if a user were to reposition the news feed 400 down such that the news posting P+2 of the news feed 400 comes into view of the client device display 404, the news posting P−2 may be removed from the top of the news feed 400, and a news posting P+3 (not shown) may be added to the bottom of the news feed 400.

As described herein in further detail, with respect to the news feed 400, the news posting P+1 and the news posting P+2 may be considered to be news postings scheduled for eventual presentation to the a user, for access, through the news feed 400 (as they have yet to be viewed by the user through the client device display 404). In some embodiments, various aspects of the news feed 400, such as behavior, orientation, appearance, and operation, may differ from what is depicted in FIG. 4 or what described herein.

Through the news feed 400, a content item included in one of the news postings 402 may be accessible by a user at a client device. For example, once a news posting included in the news feed 400 becomes visible through the client device display 404, any content items (e.g., streaming video content item) included in the news postings may be accessible to the user at the client device. In accordance with some embodiments, before one of the news postings 402 having a content item becomes accessible through the news feed 400, a priority-based content download system may pre-download the content item, in whole or in part, to a client device. For instance, before a user repositions the client device display 404 with respect to the news feed 400 such that the news posting P+2 comes into visibility through the client device display 404 (and becomes accessible to a user once in view), any content items included in the news posting P+2 may be pre-downloaded, in whole or in part, to the client device. In doing so, the content items included in the news posting P+2 would be ready to be accessed (e.g., video or audio that is auto-played) as soon as the news posting P+2 comes in view through the client device display 404. According to some embodiments, a priority-based content download system determines a first priority for a first content item included in the news posting P−1, determines a second priority for a second content item included in the news posting P+2, pre-downloads some or all of the first content item to the client device before pre-downloading the second content item if the first priority is higher than (or equal to) the second priority, and pre-downloads some or all of the second content item to the client device before pre-downloading the first content item if the second priority is higher than the first priority.

Figure 5:
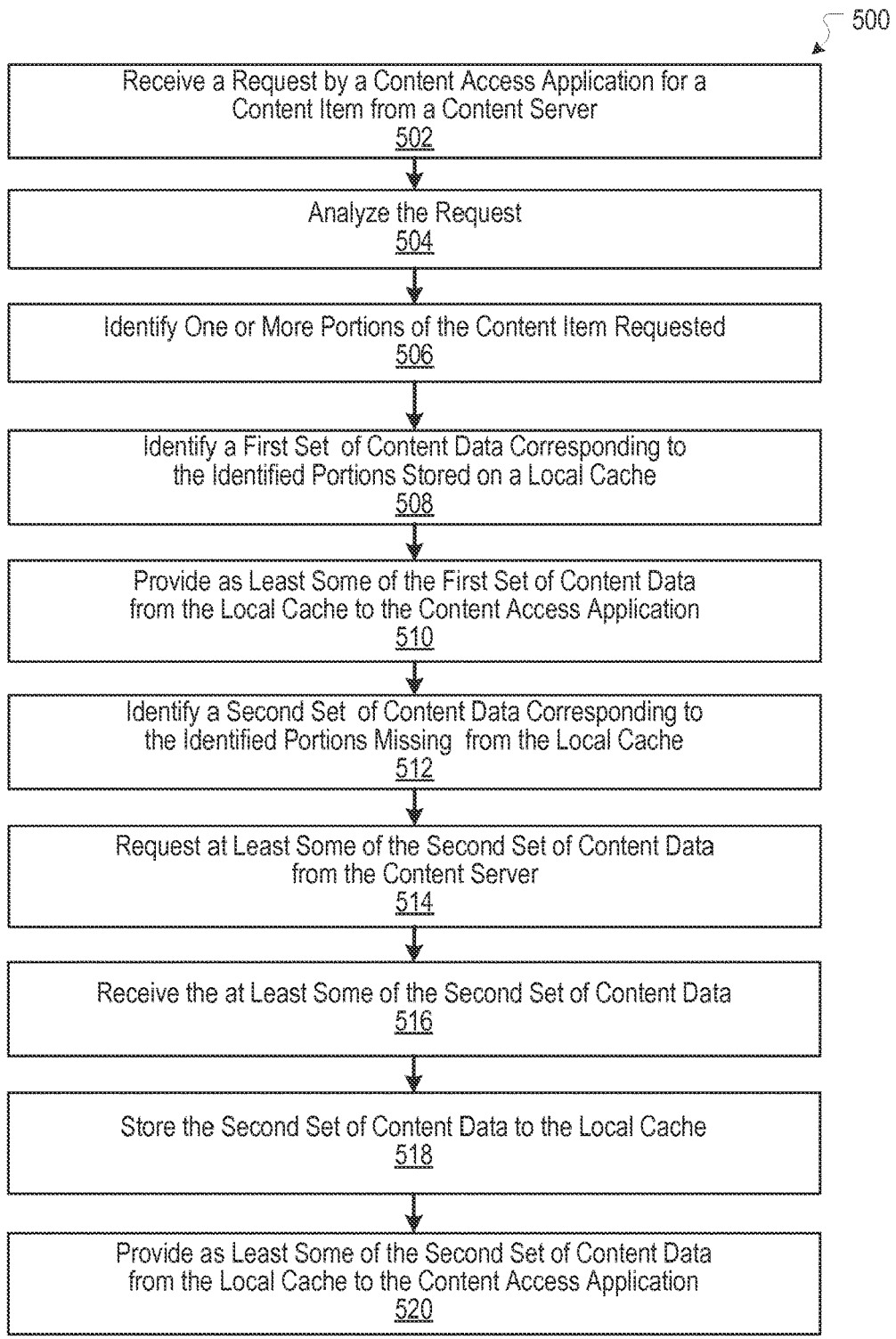
FIG. 5 illustrates an example process for intermediate content streaming in accordance with an embodiment of the invention.

FIG. 5 illustrates an example process 500 for intermediate content streaming in accordance with an embodiment of the invention. According to some embodiments, the process 500 may be one performed by the intermediate content streaming system 106 on the client device 100. At block 502, a request by a content access application for a content item from a content server, may be received. As described herein in further detail, the content access application may be operating on a client device and the request by the content access application may be received at the same client device. Depending on the embodiment, the request may be received by way of direct reception, forwarding (e.g., component on a client device configured to forward all online content item requests for processing by block 502), or interception. Additionally, the request may comprise one or more types of network protocols including, but not limited to, HTTP, FTP, and RTP.

At block 504, the request may be analyzed. By analyzing the request, the process 500 can identify the content item being requested, identify the content server from which the content item is sought, identify the type of request, or identify the specific requested portions of the content item (e.g., time position in the content item).

At block 506, one or more portions of the content item requested can be identified. For example, the process 500 may utilize the request analysis provided by block 504 to identify the requested portions of the content item.

At block 508, a first set of content data can be identified, whereby the first set of content data corresponds to one or more of the identified portions of the content item that are stored on a local cache. Where no content data in the local cache corresponds to the identified portions of the content item, the first set of content data may be empty, the first set of content data may not be generated, or one or both of blocks 508 and 510 may be skipped. For some embodiments, the local cache is located at the same client device as the client device that receives the request for the content item at block 502 and that is operating the client access application requesting the content item. Identifying the first set of content data may comprise checking the local cache for stored content data corresponding to the content item being requested, and determining whether the content data stored corresponds to the specific portions requested by the content access application.

At block 510, at least some of the first set of content data is provided from the local cache to the content access application. As noted herein in further detail, the local cache may be located at the same client device as the client device that receives the request for the content item at block 502 and that is operating the client access application requesting the content item. Additionally, the content data may be provided to the content access application from the local cache as a content data stream.

At block 512, a second set of content data can be identified, whereby the second set of content data corresponds to one or more of the identified portions of the content item that are missing from the local cache. Where all of the content item has already been received and stored to the local cache (e.g., during previous content streaming sessions), the second set of content data may be empty, the second set of content data may not be generated, or one or more of blocks 512-520 may be skipped. As noted herein in further detail, the local cache may be located at the same client device as the client device that receives the request for the content item at block 502 and that is operating the client access application requesting the content item. Additionally, identifying the second set of content data may comprise checking the local cache for stored content data corresponding to the content item being requested, and determining whether the content data stored corresponds to the specific portions requested by the content access application. In addition, identifying the second set of content data may comprise comparing what the content data stored at the local cache with content data available from the content server from which the content item is being requested by the content access application.

At block 514, at least some of the second set of content data may be requested from the content server, and at block 516, the content data from the content server is received from the content server. According to some embodiments, the process 500 utilizes the request analysis provided by block 504 to generate a request to the content server for the second set of content data. Based on the analysis, the process 500 may generate a request to the content server that is similar (e.g., in format or protocol) to the request received from the content access application at block 502. The content data from the content server may be received at block 516 as a data stream, and the data stream may similar to a data stream provided to the content server to the content access application if the content server were providing the content data directly to the content access application (e.g., if the intermediate content streaming system 106 were not involved in the content data stream).

At block 518, the second set of content data received from the content server (e.g., in response to the request of block 514) can be stored to the local cache. As noted herein in further detail, the local cache may be located at the same client device as the client device that receives the request for the content item at block 502 and that is operating the client access application requesting the content item.

At block 520, at least some of the second set of content data can be provided to the content access application from the local cache. Similar to block 510, the content data may be provided to the content access application from the local cache as a content data stream. For some embodiments, the data stream provided to the content access application by either block 510, block 520, or both, may be similar to the data stream used to receive content data from the content server at block 516.

Depending on the embodiment, the operations illustrated in FIG. 5 may be performed in an alternative order than shown, and one or more operations may be performed in series or substantially in parallel. For example, the operations of block 508, involving the first set of content data, may be performed in parallel or substantially in parallel with operations of one or more of blocks 512, 514, 516, and 518, which involve the second set of content data. In another example, the operations of block 518 and the operations of block 520 may be performed in parallel or substantially in parallel. In yet another example, the operations of block 520 may be performed before the operations of block 518. For some embodiments, a process for intermediate content streaming performs more or less operations than those shown.

Figure 6:
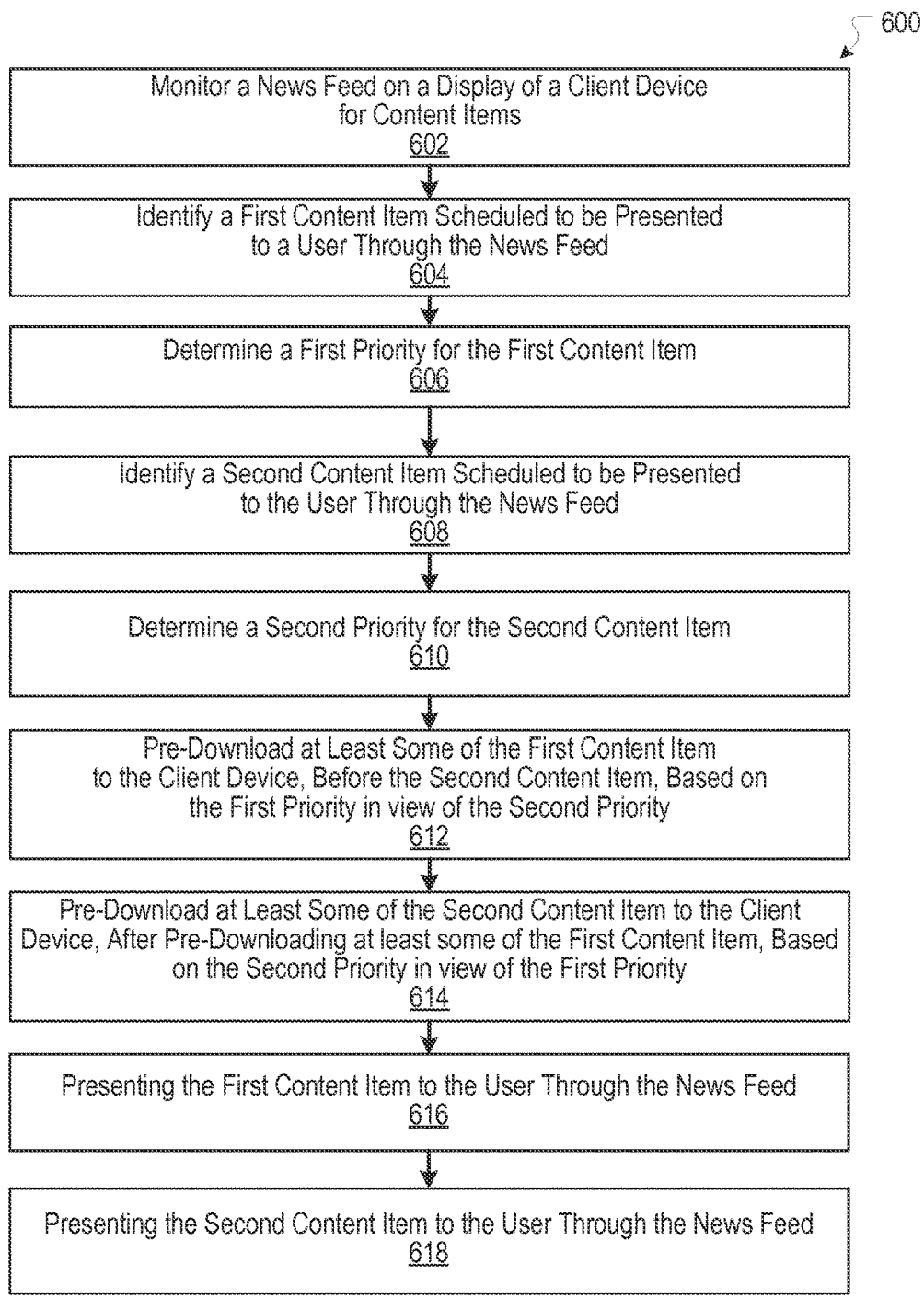
FIG. 6 illustrates an example process for priority-based content downloading in accordance with an embodiment of the invention.

FIG. 6 illustrates an example process 600 for priority-based content downloading in accordance with an embodiment of the invention. According to some embodiments, the process 600 may be one performed by the priority-based content download system 108. At block 602, a news feed (e.g., news feed 400) on a display of a client device may be monitored for content items. As described herein in further detail, the content items being monitored for may be those currently visible to a user through the news feed, those scheduled to be presented through the news feed, or both.

At block 604, a first content item scheduled to be presented to a user through the news feed may be identified. As described herein in further detail, a content item scheduled to be presented through the news feed can be one included in a news posting scheduled to be presented on a news feed. Additionally, a news posting scheduled to be presented on a news feed can be one that has yet to be added to the news feed, one that has yet to be added back to the news feed after a previous removal from the news feed, one that has already been added to the news feed but has yet to be viewed through the news feed by a user, or one that has already been viewed at least once through the news feed by the user but is currently not in view of the user.

At block 606, a first priority for the first content item may be determined. As described herein in further detail, determining a priority for a content item can be based on any number of factors including, without limitation: whether the content item is auto-played when visible to the user; whether the content item is associated with an advertisement; a preference of the user; availability of a resource of the client device (e.g., memory, processor speed, network bandwidth, etc.); a content type of the content item (e.g., streaming video, audio, or presentation); metadata of the first content item (e.g., author, publishers, subject matter, title, etc.); the social networking information associated with the content item. For some embodiments, the social networking information comprises a quantity of likes of the content item by social network users on a social network, a quantity of shares of the content item by social network users on a social network, or a quantity of comments associated with the content item by social network users on a social network. The social networking information may identify one or more social network users who have liked the first content item on a social network, identify one or more social network users who have shared the first content item on a social network, or identify one or more social network users who have commented on the first content item on a social network. The social information used for determining a priority of a content item may be provided by a social graph maintained by a social networking system to support its various features.

At block 608, a second content item scheduled to be presented to a user through the news feed may be identified, and at block 610, a second priority for the second content item may be determined. The second priority for the second content item may be determined in a similar manner as the first priority is determined for the first content item at block 606.

At block 612, at least some of the first content item may be pre-downloaded to the client device, before the second content item is pre-downloaded to the client device, based on the first priority in view of the second priority. This may occur, for example, where the first priority and the second priority are compared and the first priority is determined to be higher than the second priority. When pre-downloading a content item to the client device, the portions of the content item pre-downloaded may be stored at a local cache located at the client device. The local cache utilized may one shared with an intermediate content streaming system described herein. In some embodiments, the pre-downloading of content items may be facilitated by instructing an intermediate content streaming system described herein to pre-download the content on behalf of process 600.

At block 614, at least some of the second content item may be pre-downloaded to the client device, after at least some of the first content item is pre-downloaded to the client device, based on the second priority in view of the first priority. According to some embodiments, the second content item begins pre-downloading to the client device after the first content item begins pre-downloading to the client device, but before the pre-downloading for the first content item has completed. In this way the first and second content items may be pre-downloaded to the client device substantially in parallel when possible.

At block 616, the first content item may be presented to the user through the news feed. Additionally, at block 618, the second content item may be presented to the user through the news feed. By presenting a content item through the news feed, the content item can become accessible to the user through the news feed. In some embodiments, once a content item has been pre-downloaded to the client device and presented through the news feed, the content item is accessed when in view of the user (e.g., on the client device display 404) and selected by the user (e.g., user selects to play the content item). In some embodiments, once a content item has been pre-downloaded to the client device and presented through the news feed, the content item is auto-accessed (e.g., auto-played) when the content item comes into view of the user (e.g., on the client device display 404).

Depending on the embodiment, the operations illustrated in FIG. 6 may be performed in an alternative order than shown, and one or more operations may be performed in series or substantially in parallel. Additionally, for some embodiments, a process for priority-based content downloading performs more or less operations than those shown.

FIG. 7 illustrates an example of a network diagram of system for intermediate content streaming and priority-based content download in a social networking environment 700 in accordance with an embodiment of the invention. The social networking environment 700 includes one or more user devices 710, one or more external systems 722, the social networking system 730, and a network 750. For purposes of illustration, the embodiment of the social networking environment 700, shown by FIG. 7, includes a single external system 722 and a single user device 710. However, in other embodiments, the social networking environment 700 may include more user devices 710 and more external systems 722. In certain embodiments, the social networking system 730 is operated by a social network provider, whereas the external systems 722 are separate from the social networking system 730 in that they may be operated by different entities. In various embodiments, however, the social networking system 730 and the external systems 722 operate in conjunction to provide social networking services to users (or members) of the social networking system 730. In this sense, the social networking system 730 provides a platform or backbone, which other systems, such as external systems 722, may use to provide social networking services and functionalities to users across the Internet.

The user device 710 comprises one or more computing devices that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 722 and the social networking system 730 via the network 750, which may comprise any combination of local area and wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 722 and/or from the social networking system 730 by processing a markup language document 714 received from the external system 722 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 722 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 722 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable customization of the data communicated from the social networking system 730 to the user device 710.

The external system 722 includes one or more web servers that include one or more web pages 724a, 724b, which are communicated to the user device 710 using the network 750. The external system 722 is separate from the social networking system 730. For example, the external system 722 is associated with a first domain, while the social networking system 730 is associated with a separate social networking domain. Web pages 724a, 724b, included in the external system 722, comprise markup language documents 714 identifying content and including instructions specifying formatting or presentation of the identified content.

In one embodiment, the user device 710 includes an intermediate content streaming system 718 configured to cache content items locally at the user device 710 as content data for the content items is streamed to the user device 710 from a content server, such as an external system 722, over the network 750. Through the intermediate content streaming system 718 at the user device 710, the browser application 712 at the user device 710, which may be accessing web pages provided by the social networking system 730, can request and some or all of a content item (e.g., audio) included in the web pages but provided by the external system 722. Once received by the intermediate content streaming system 718 from the external system 722 (e.g., as a data stream), the content data can be provided by the intermediate content streaming system 718 to the browser application 712 (e.g., a content access plugin in the browser application 712) as a data stream. Additionally, content data received by the intermediate content streaming system 718 from the external system 722 can be locally cached at the user device 710. The local cache at the user device 710 may be maintained for the benefit of future requests for the same content item by the user device 710. For subsequent requests for the same content item, the intermediate content streaming system 718 can provide those portions of the content item previously received from the external system 722 from the local cache at the user device 710, and obtain from the external system 722 those portions not locally cached at the user device 710 and provide those obtained portions accordingly.

In one embodiment, the user device 710 includes a the priority-based content download system 720 configured to facilitate priority-based pre-downloading of content items to the user device 710 before a user at the user device 710 is presented with access to the content items, such as through a social networking news feed provided by the social networking system 730 and accessible through the browser application 712. For instance, as a user is viewing such a news feed through the browser application 712, content items included in one or more news postings of the news feed can be pre-downloaded, in whole or in part, to the user device 710 before such news postings are made accessible to the user (e.g., of the news feed) through the news feed.

The social networking system 730 includes one or more computing devices for a social network, including a plurality of users, and providing users of the social network with the ability to communicate and interact with other users of the social network. As described herein in further detail, the social network can be represented by a graph, i.e., a data structure including edges and nodes. Other data structures can also be used to represent the social network, including but not limited to databases, objects, classes, meta elements, files, or any other data structure.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 722, separate from the social networking system 730, or coupled to the social networking system 730 via the network 750.

The social networking system 730 is also capable of linking a variety of entities. For example, the social networking system 730 enables users to interact with each other as well as external systems 722 or other entities through an API, a web service, or other communication channels. As discussed herein, the social networking system 730 can generate and maintain a "social graph" comprising a plurality of nodes interconnected by a plurality of edges, where each node in the social graph may represent an entity that can act on another node and/or that can be acted on by another node. The social graph may include various types of nodes, including, for example, users, non-person entities, content items, web pages, groups, activities, messages, concepts, and any other things that can be represented by an object in the social networking system 730. As described herein in further detail, an edge between two nodes in the social graph may represent a particular kind of connection, or association, between the two nodes, which may result from node relationships or from an action that was performed by one of the nodes on the other node. As further discussed, the edges between nodes can be weighted, where the weight of an edge can represent an attribute associated with the edge, such as a strength of the connection or association between nodes. Different types of edges can be provided with different weights.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third-party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 722 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 722 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 722 and user devices 710 to call access information from the social networking system 730 by calling one or more API functions. The API request server 734 may also allow external systems 722 to send information to the social networking system 730 by calling APIs. The external system 722, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 722 via the network 750. For example, responsive to an API request, the API request server 734 collects data associated with a user, such as the user's connections that have logged into the external system 722, and communicates the collected data to the external system 722. In another embodiment, the user device 710 communicates with the social networking system 730 via APIs in the same manner as external systems 722.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 722 that is separate from the social networking system 730. For example, the action logger 740 may receive data describing a user's interaction with an external system 722 from the web server 732. In this example, the external system 722 reports a user's interaction according to structured actions and objects in the social graph.

Other examples of actions where a user interacts with an external system 722 include a user expressing an interest in an external system 722 or another entity, a user posting a comment to the social networking system 730 that discusses an external system 722 or a web page 724*a* within the external system 722, a user posting to the social networking system 730 a Uniform Resource Locator (URL) or other identifier associated with an external system 722, a user attending an event associated with an external system 722, or any other action by a user that is related to an external system 722. Thus, the activity log 742 may include actions describing interactions between a user of the social networking system 730 and an external system 722 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 722, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 722. One embodiment allows the specification of the set of entities to comprise an enumeration of entities. For example, the user may provide a list of external systems 722 that are allowed to access certain information. Another embodiment allows the specification to comprise a set of entities along with exceptions that are not allowed to access the information. For example, a user may allow all external systems 722 to access the user's work information, but specify a list of external systems 722 that are not allowed to access the work information. Certain embodiments call the list of exceptions that are not allowed to access certain information a "block list". External systems 722 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 722, and/or other applications and entities. The external system 722 may need authorization from the authorization server 744 to access the user's more private and sensitive information, such as the user's work phone number. Based on the user's privacy settings, the authorization server 744 determines if another user, the external system 722, an application, or another entity is allowed to access information associated with the user, including information about actions taken by the user.

Figure 8:
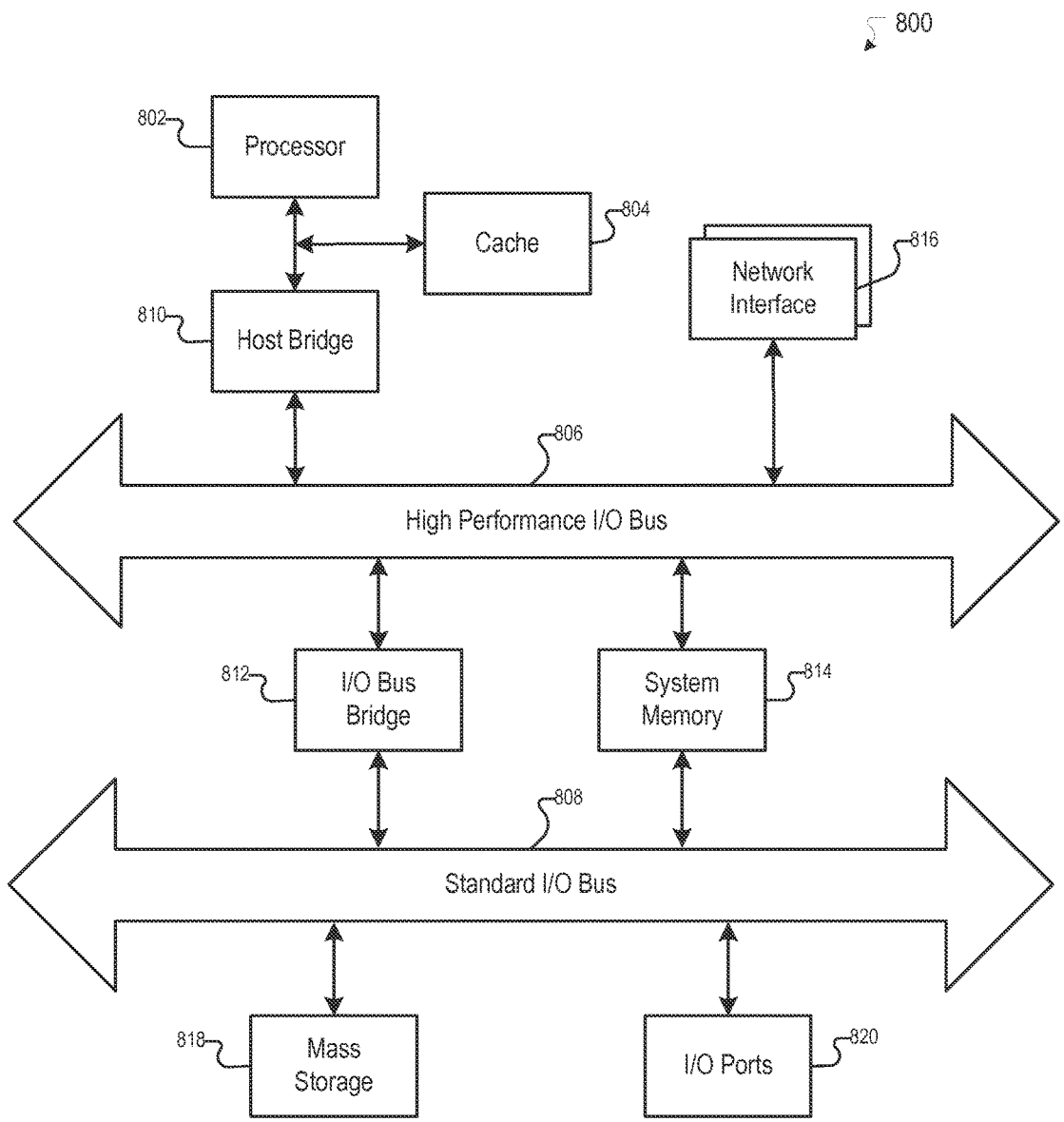
FIG. 8 illustrates a diagram of a computer system in accordance with an embodiment of the invention.

The foregoing processes, systems and features can be implemented by a wide variety of machine and computer system architectures and in a wide variety of network and computing environments. FIG. 8 illustrates an example of a computer system 800 that may be used to implement one or more of the computing devices identified above. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be one of the client device 100, the social networking system 730, or a component thereof.

The computer system 800 includes a processor 802, a cache memory 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples the processor 802 to the high performance I/O bus 806, whereas I/O bus bridge 812 couples the two buses 806 and 808 to each other. A system memory 814 and one or more network interfaces 816 couple to the bus 806. The computer system 800 may further include video memory and a display device coupled to the video memory (not shown). Mass storage 818 and I/O ports 820 couple to the bus 808. The computer system 800 may optionally include a keyboard and pointing device, a display device, or other input/output devices (not shown) coupled to the bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System; the Apple Macintosh Operating System, available from Apple Computer Inc. of Cupertino, Calif.; UNIX operating systems; Microsoft® Windows® operating systems; BSD operating systems; and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 which, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814, and then accessed and executed by processor 802. In various implementations, a module or modules can be executed by a processor or multiple processors in one or multiple locations, such as multiple servers in a parallel processing environment.

Examples of computer readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "another embodiment", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment", "in an embodiment", or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    intercepting, by an intermediate content streaming system at a client device, a request being made to a content server by a first content access application for a content item, the request being intercepted before the request is sent to the content server;
    analyzing, by the intermediate content streaming system at the client device, the intercepted request to identify at least one of the content item being requested, the content server from which the content item is being requested, a type of request, and requested portions of the content item;

identifying, by the intermediate content streaming system at the client device, one or more first portions of the content item requested from the content server by the first content access application based on the analyzed request, the first content access application operating on the client device and being different from the intermediate content streaming system;

identifying, by the intermediate content streaming system, a first set and a second set of content data of the content item, the first set of content data corresponding to the first portions of the content item stored on a local cache of the client device, and the second set of content data corresponding to the first portions of the content item not stored on the local cache, the first set of content data of the content item having been pre-downloaded to the local cache by a priority-based content download system based at least in part on a likelihood of the content item being encountered by a user operating the client device, the likelihood being determined based on a quantity of social networking signals received for the content item from one or more other users that share a pre-defined relationship with the user;

providing, by the intermediate content streaming system, from the local cache at least some of the first set of content data to the first content access application;

requesting, by the intermediate content streaming system on behalf of the first content access application, at least some of the second set of content data from the content server;

receiving, by the intermediate content streaming system on behalf of the first content access application, the at least some of the second set of content data from the content server;

providing, by the intermediate content streaming system, the at least some of the second set of content data to the first content access application; and storing, by the intermediate content streaming system, the at least some of the second set of content data to the local cache, wherein the first set of content data and the at least some of the second set of content data are accessible and executable, via the local cache, by a second content access application operating on the client device, wherein the second content access application is different from the first content access application and from the intermediate content streaming system, and wherein the first set of content data and the at least some of the second set of content data are accessible to the first content access application via the intermediate content streaming system based on future requests while the first set and the at least some of the second set are stored in the local cache.

2. The computer-implemented method of claim 1, further comprising receiving, at the client device, the request for the content item from the first content access application to the content server.

3. The computer-implemented method of claim 1, wherein the first content access application comprises a buffer, the buffer being different from the local cache.

4. The computer-implemented method of claim 1, wherein the local cache is external to the first content access application.

5. The computer-implemented method of claim 1, wherein the at least some of the first set of content data is provided to the first content access application as a data stream.

6. The computer-implemented method of claim 1, wherein the at least some of the second set of content data is received from the first content server as a data stream.

7. The computer-implemented method of claim 1, wherein the at least some of the second set of content data is provided to the first content access application as a data stream.

8. The computer-implemented method of claim 1, wherein the first portions correspond to a time position in the content item.

9. The computer-implemented method of claim 1, further comprising:
   identifying, at the client device, one or more second portions of the content item requested by the second content access application from the content server, the second content access application operating on the client device;
   identifying, by the intermediate content streaming system, a first set and a second set of content data of the content item, the first set of content data corresponding to the first portions of the content item stored on a local cache of the client device, and the second set of content data corresponding to the first portions of the content item not stored on the local cache;
   providing from the local cache at least some of the third set of content data to the second content access application;
   requesting at least some of the fourth set of content data from the content server;
   receiving the at least some of the fourth set of content data from the content server;
   providing the at least some of the fourth set of content data to the second content access application; and
   storing the at least some of the fourth set of content data to the local cache.

10. The computer-implemented method of claim 1, further comprising purging at least some content data from the local cache based on a priority of the content item.

11. The computer-implemented method of claim 10, wherein the purging the at least some content data is performed when an amount of content data stored in the local cache meets or exceeds a storage threshold.

12. The computer-implemented method of claim 11, further comprising determining whether the amount of content data stored in the local cache meets or exceeds a storage threshold.

13. The computer-implemented method of claim 10, further comprising determining a priority for the content item.

14. The computer-implemented method of claim 13, wherein the determining the priority is based on at least one of whether the content item is auto-played when visible to the user, or availability of a resource of the client device.

15. The computer-implemented method of claim 13, wherein the determining the priority is based on at least one of a content type of the content item, whether the content item is associated with an advertisement, or metadata of the content item.

16. The computer-implemented method of claim 13, wherein the determining the priority is based on social networking information associated with the content item.

17. The computer-implemented method of claim 1, wherein the content access application relates to a social network.

18. A computer system comprising:
   at least one processor; and
   a memory storing instructions configured to instruct the at least one processor to perform:

intercepting, by an intermediate content streaming system at a client device, a request being made to a content server by a first content access application for a content item, the request being intercepted before the request is sent to the content server;

analyzing, by the intermediate content streaming system at the client device, the intercepted request to identify at least one of the content item being requested, the content server from which the content item is being requested, a type of request, and requested portions of the content item;

identifying, by the intermediate content streaming system at the client device, one or more first portions of the content item requested from the content server by the first content access application based on the analyzed request, the first content access application operating on the client device and being different from the intermediate content streaming system;

identifying, by the intermediate content streaming system, a first set and a second set of content data of the content item, the first set of content data corresponding to the first portions of the content item stored on a local cache of the client device, and the second set of content data corresponding to the first portions of the content item not stored on the local cache, the first set of content data of the content item having been pre-downloaded to the local cache by a priority-based content download system based at least in part on a likelihood of the content item being encountered by a user operating the client device, the likelihood being determined based on a quantity of social networking signals received for the content item from one or more other users that share a pre-defined relationship with the user;

providing, by the intermediate content streaming system, from the local cache at least some of the first set of content data to the first content access application;

requesting, by the intermediate content streaming system on behalf of the first content access application, at least some of the second set of content data from the content server;

receiving, by the intermediate content streaming system on behalf of the first content access application, the at least some of the second set of content data from the content server;

providing, by the intermediate content streaming system, the at least some of the second set of content data to the first content access application; and storing, by the intermediate content streaming system, the at least some of the second set of content data to the local cache, wherein the first set of content data and the at least some of the second set of content data are accessible and executable, via the local cache, by a second content access application operating on the client device, wherein the second content access application is different from the first content access application and from the intermediate content streaming system, and wherein the first set of content data and the at least some of the second set of content data are accessible to the first content access application via the intermediate content streaming system based on future requests while the first set and the at least some of the second set are stored in the local cache.

19. A non-transitory computer-storage medium storing computer-executable instructions that, when executed, cause a computer system to perform a computer-implemented method comprising:

intercepting, by an intermediate content streaming system at a client device, a request being made to a content server by a first content access application for a content item, the request being intercepted before the request is sent to the content server;

analyzing, by the intermediate content streaming system at the client device, the intercepted request to identify at least one of the content item being requested, the content server from which the content item is being requested, a type of request, and requested portions of the content item;

identifying, by the intermediate content streaming system at the client device, one or more first portions of the content item requested from the content server by the first content access application based on the analyzed request, the first content access application operating on the client device and being different from the intermediate content streaming system;

identifying, by the intermediate content streaming system, a first set and a second set of content data of the content item, the first set of content data corresponding to the first portions of the content item stored on a local cache of the client device, and the second set of content data corresponding to the first portions of the content item not stored on the local cache, the first set of content data of the content item having been pre-downloaded to the local cache by a priority-based content download system based at least in part on a likelihood of the content item being encountered by a user operating the client device, the likelihood being determined based on a quantity of social networking signals received for the content item from one or more other users that share a pre-defined relationship with the user;

providing, by the intermediate content streaming system, from the local cache at least some of the first set of content data to the first content access application;

requesting, by the intermediate content streaming system on behalf of the first content access application, at least some of the second set of content data from the content server;

receiving, by the intermediate content streaming system on behalf of the first content access application, the at least some of the second set of content data from the content server;

providing, by the intermediate content streaming system, the at least some of the second set of content data to the first content access application; and storing, by the intermediate content streaming system, the at least some of the second set of content data to the local cache, wherein the first set of content data and the at least some of the second set of content data are accessible and executable, via the local cache, by a second content access application operating on the client device, wherein the second content access application is different from the first content access application and from the intermediate content streaming system, and wherein the first set of content data and the at least some of the second set of content data are accessible to the first content access application via the intermediate content streaming system based on future requests while the first set and the at least some of the second set are stored in the local cache.

* * * * *